Nov. 15, 1938. R. GOLL Re. 20,918

ROLLER MILL

Original Filed April 30, 1935 5 Sheets-Sheet 1

Inventor
RICHARD GOLL

By C. P. Goepel.
Attorney

Nov. 15, 1938. R. GOLL Re. 20,918

ROLLER MILL

Original Filed April 30, 1935 5 Sheets-Sheet 2

Inventor
RICHARD GOLL

By C. P. Goepel.
Attorney

Nov. 15, 1938. R. GOLL Re. 20,918

ROLLER MILL

Original Filed April 30, 1935 5 Sheets-Sheet 3

Inventor
RICHARD GOLL
By C. P. Goepel.
Attorney

Nov. 15, 1938. R. GOLL Re. 20,918

ROLLER MILL

Original Filed April 30, 1935 5 Sheets-Sheet 4

Inventor

RICHARD GOLL

By C. P. Goepel.

Attorney

Nov. 15, 1938. R. GOLL Re. 20,918
ROLLER MILL
Original Filed April 30, 1935 5 Sheets-Sheet 5
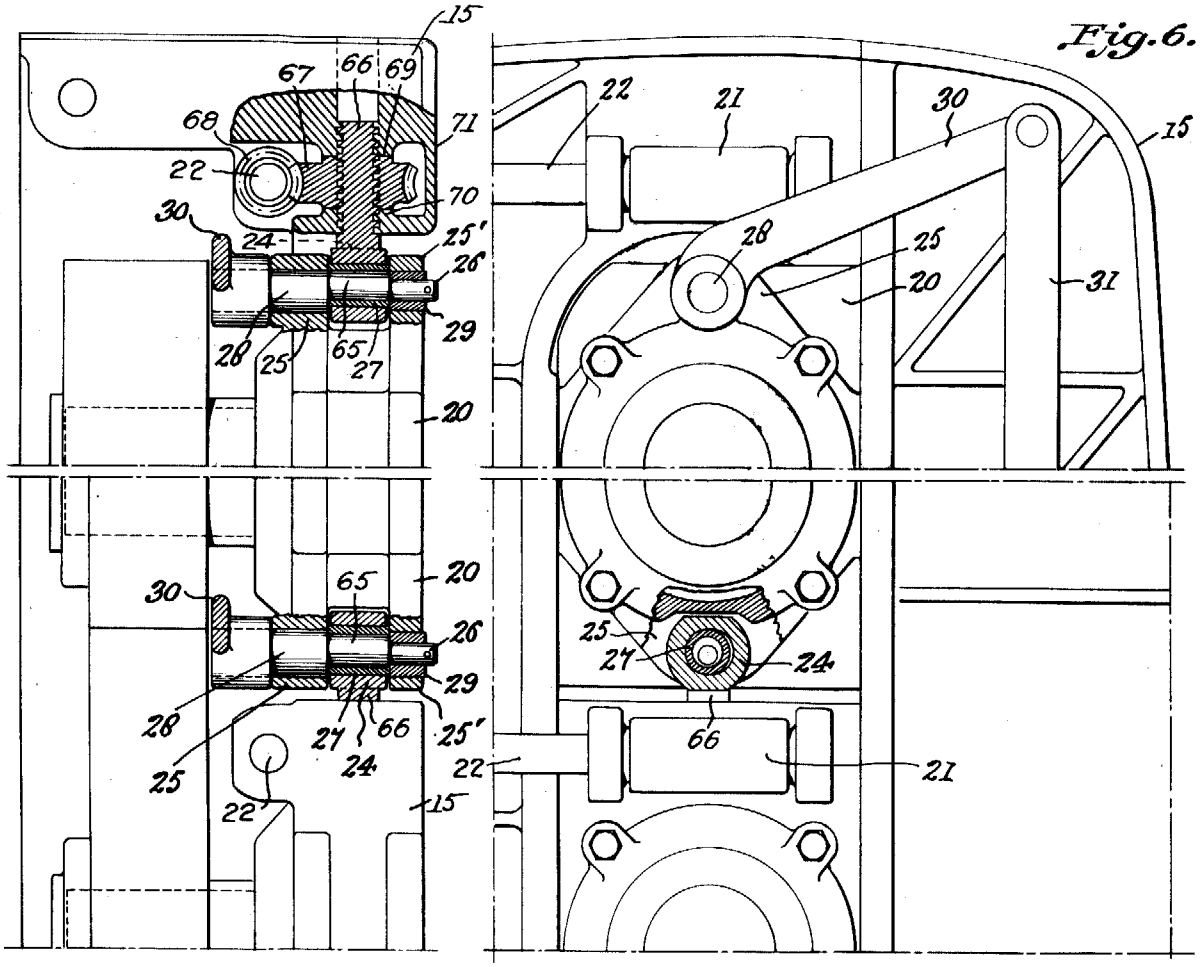
Inventor
RICHARD GOLL
By C. P. Goepel.
Attorney Reissued Nov. 15, 1938

Re. 20,918

UNITED STATES PATENT OFFICE 20,918

ROLLER MILL

Richard Goll, Dresden, Germany, assignor to J. M. Lehmann Company, Inc., New York, N. Y., a corporation of New York Original No. 2,093,606, dated September 21, 1937, Serial No. 19,010, April 30, 1935. Application for reissue April 30, 1938, Serial No. 205,381

10 Claims. (Cl. 308—62)

The present invention relates to roller mills, and more particularly to an improved roll operating means therefor. In this type of mill, for grinding ink, paint and other materials, the rolls are individually adjusted with great care and delicacy and after they are once so adjusted it is advantageous to maintain such adjustment so as to avoid repeating this delicate operation each time the rolls are opened for cleaning and for other well known reasons. It has also been found that a finer adjustment and other advantages are obtained by placing the rolls with their axes in a straight line, either horizontally or vertically with the latter preferred, so that the rolls and the spaces between them may be better inspected to facilitate the handling of the mill, and the problem is to admit of this fine and delicate individual adjustment of the rolls and also admit the quick acting opening and closing of all of the rolls without disturbing the fine adjustment and by use of a single instrumentality, such as a lever.

It is therefore an object to provide a single mechanism for operating all of the rolls of the mill to separate and return the rolls without disturbing their individual fine adjustments.

Another object is to provide a single mechanism for operating all of the rolls and which, when the rolls are closed together for normal operation, is automatically locked without the use of supplemental locking devices to hold the rolls in operating position.

A further object of this invention is to provide a single operating mechanism for all of the rolls which is applicable to mills having their rolls arranged with the axes vertically in line so that all of the advantages of this type of mill may be maintained with the improved single mechanism applied thereto.

With the foregoing and other objects in view, the invention will be more fully described hereinafter, and will be more particularly pointed out in the claims appended hereto.

In the drawings, wherein like symbols refer to like or corresponding parts throughout the several views:

Figure 5 is a detail fragmentary sectional view taken through the roll operating mechanism at one end of the mill shown in Figure 1, and Figure 6 is a side elevation of the same, partly broken away and showing the eccentric structure.

Figure 1:
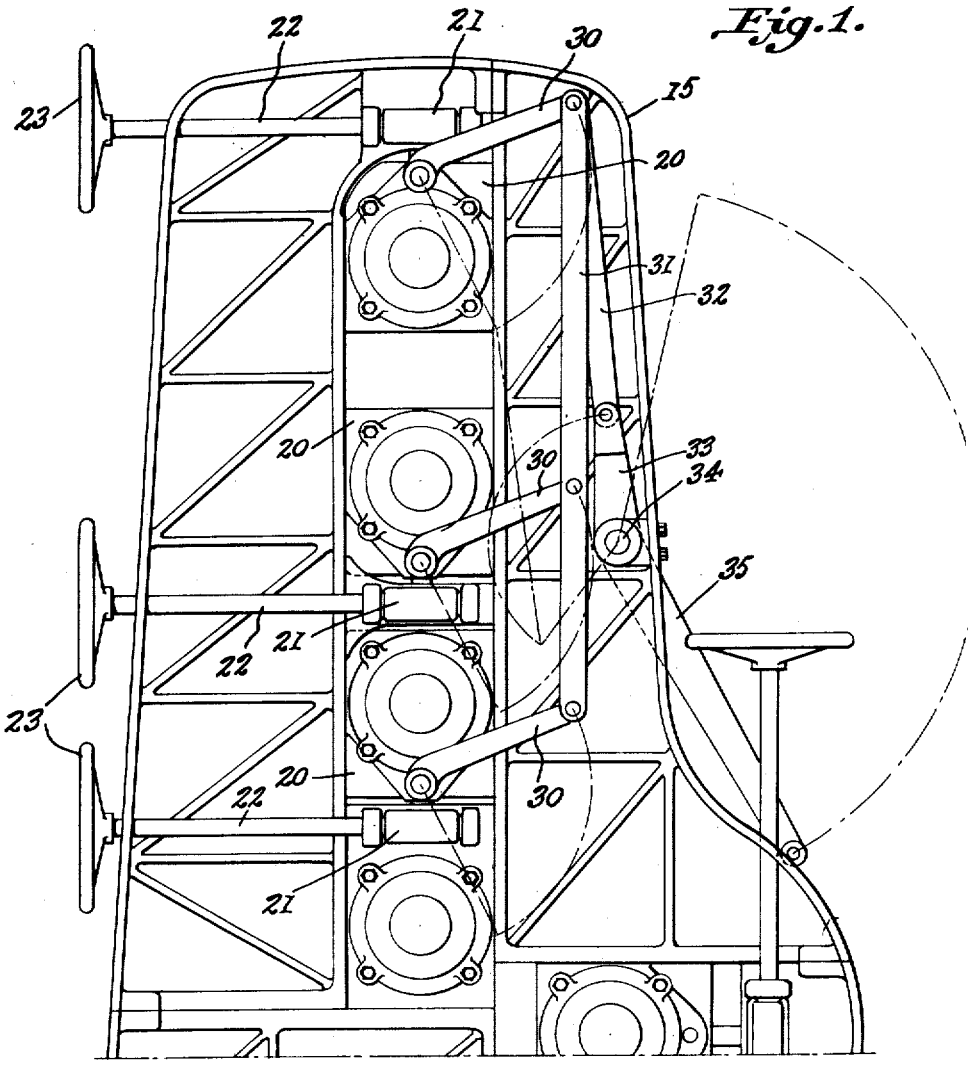
Figure 1 is a side elevation of a roller mill embodying the features of this invention and showing the single roll operating means in locked position for normal operation of the rolls.

Referring now to the drawings, and first to Figures 1, 2, 5 and 6, the mill is provided with a conventional type of frame 15 in which are disposed a plurality of adjustable rolls 16, 17, 18 and a fixed roll 19 on one side thereof, the same having their axes in line and with the rolls disposed vertically relative to each other as shown. The rolls are mounted at opposite ends in bearing blocks 20 which are slidably disposed in the frame 15 so that the blocks 20 may be relatively removed for spacing the rolls at a desired distance apart, according to the character and viscosity of the material to be ground in the mill.

The bearing blocks 20 are adjusted independently in the frame 15 by gearing 21 with a gearing provided for each bearing block, and each gearing having a shaft 22 with a hand wheel 23 on its outer end by means of which the gearing may be operated in the usual manner for obtaining a nice or fine adjustment of the rolls relatively one to the other and at opposite ends.

According to the present invention means is provided for simultaneously moving or operating the rolls 16, 17 and 18, or any other desired number of rolls used in the mill and which are adjustable relative to each other and to the stationary roll 19. As shown in Figure 5, there is an adjustable connection between the frame 15 and the endmost bearing blocks 20 of the rolls. Each connection comprises an adjustment screw 66 having a head 24 serving as a bearing lug in the form of a projection which fits between a pair of bearing lugs 25 and 25′ carried upon the adjacent end of the block 20. All of the elements 24, 25 and 25′ are provided with substantially registering coaxial openings therethrough and there is provided sufficient clearance in the throat between the bearing block lugs 25 and 25′ to admit of the movement of the head or lug 24 between the lugs 25 and 25′ so as to move the bearing block 20 toward and away from the frame 15 as will now be described.

An eccentric shaft 26 is journaled in bearing block lugs 25 and 25′ and is provided at its center with an eccentric portion 65 acting as a crank arm and fitted with a sleeve or bearing bushing 27 to maintain the eccentric shaft 26 in coaxial alinement with the bore of the lug 24. The shaft 26 is provided at the outer side of the lug 24 with a journal 28 and the free end of the eccentric shaft 26 is mounted in a suitable bearing or bushing 29 provided in the opposite lug 25' of the bearing block. The outer or other end of the eccentric shaft 26 is provided with a crank arm 30 which has a hub portion secured to shaft 26 serving as a head or shoulder bearing against the lug 25, while a pin or the like may be used upon the free end of the shaft 26 to hold it from withdrawal from the lugs 25 and 25'. The crank arm 30 is disposed normally in a raised position, as shown in Figures 1 and 6, and wherein the eccentric portion 65 is at dead center with respect to the elements 24, 25 and 25' so as to lock these elements in their normal position with the rolls of the mill in operative position and adjusted according to the fine adjustment of the gearing 21. The eccentric portions 65 of each shaft 26 are so disposed relative to the bearing blocks that when the crank arms 30 of all of the connections are moved in one direction the blocks will be correspondingly moved in such directions as to space the rolls apart and thus open them for cleaning, inspection or other operations required in the raising of the mill.

It will be noted that these eccentric portions 65 do not disturb the gearing 21 as the latter operates only on the lugs 24 relative to the frame 15 so that these quick acting connections of the present invention merely provide links or connections between the gearings 21 and their adjacent blocks 20. It will also be noted that the axes of the rolls are disposed in line and the crank levers 30 extend laterally in one direction and are coupled together by a connecting link 31 so as to insure uniform movement of the arms or levers 30 and consequently the uniform separation or advancement of the rolls relative to one another. The fine adjustment of the rolls with respect to each other is accomplished by the mechanism shown at the top of Fig. 5. The shaft 22 is provided with a worm gear 66 which meshes with gear 67. The latter gear is mounted between two bosses 69 and 70 forming part of the frame 15. This gear 67 is axially bored and the bore is internally threaded with a worm which meshes with threads on shaft 66. It is evident that, upon rotation of shaft 22, the shaft 66 is moved axially, the motion of this shaft thus raising or lowering the bearing block 20 through the connections 24, 27, 65, 26, 28, 25 and 25'. This fine adjustment of the bearing blocks 20 with respect to the frame 15 is independent of the movement produced by the quick acting mechanism described above.

The single operating mechanism for the rolls also includes an operating link 32 which is connected to the connecting link 31 at preferably the upper end thereof and which is also connected to a crank arm 33 on a crank shaft 34 mounted in the frame 15 and provided with an operating handle 35.

In the normal position on the operating mechanism the operating link 32 and the crank arm 33 are in a dead center position so as to lock the parts against any tendency for movement out of their normal position.

As shown by the dotted lines in Figure 1, the crank arm 33 swings through a substantial arc when the handle 35 is raised so as to break the dead center position of the mechanism and to draw the operating link 32 downwardly by the turning of the crank arm 33 which effects the downward movement of the connecting link 31 and the simultaneous and equal swinging downwardly of the crank levers 30. Thus, the eccentric portions 65 (Fig. 5) of all of the quick opening connections are actuated so that all of the movable rolls are shifted into open position and without disturbing the fine and delicate adjustments of the gearing 21.

Figure 3:
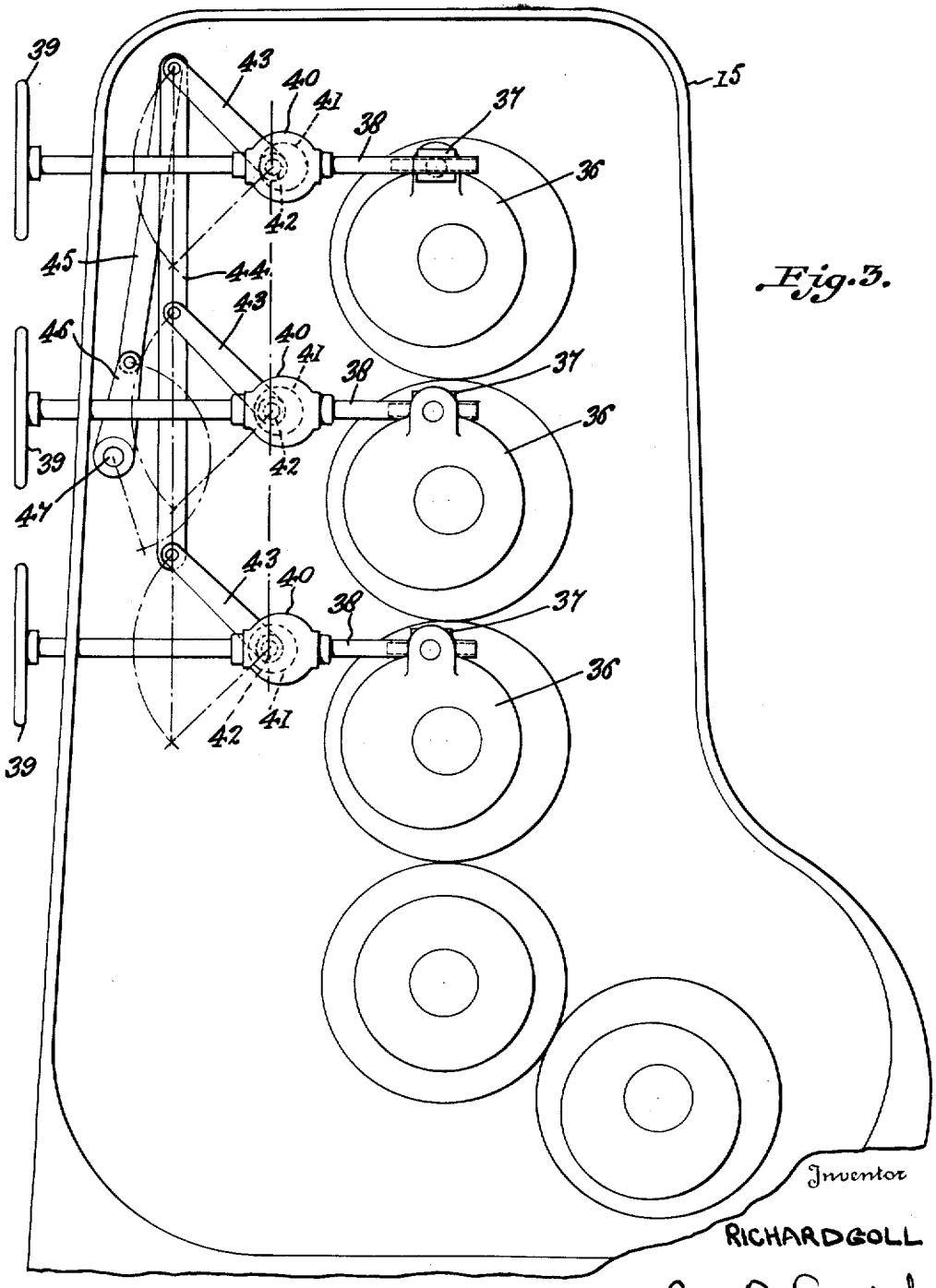
Figure 3 is an end elevation of a roller mill, showing a modified form of the single roll operating mechanism.

As a modification of the invention, another structure is shown in Figure 3. In this form of the invention the rolls are provided on their ends with eccentrics 36 which are connected by gearing 37 to shafts 38 having hand wheels 39 on their outer ends by means of which the rolls may be individually adjusted so as to obtain a nice and delicate adjustment between the rolls. In addition to this each shaft 38 is provided with an eccentric housing 40 intermediate its length in which is disposed an eccentric 41 mounted on a shaft 42 and having a lever 43 thereon, the lever 43 adapted to swing through the arc shown in broken lines for turning the eccentric 41 and quickly moving the shaft 38 longitudinally of its axis to effect a quick turning of the eccentric 36 of the roller.

The levers 43 are connected together at their outer ends by a connecting link 44 and the latter is connected at preferably one end to an operating link 45 which is pivoted to a crank arm 46 mounted on the shaft 47 suitably disposed in the frame 15 and which is adapted to be operated in the manner shown in Figure 1 for simultaneously swinging the levers 43 out of and back into normal position for opening and closing the rolls without disturbing the fine and delicate adjustment of the same by the respective gearings 37.

Figure 4:
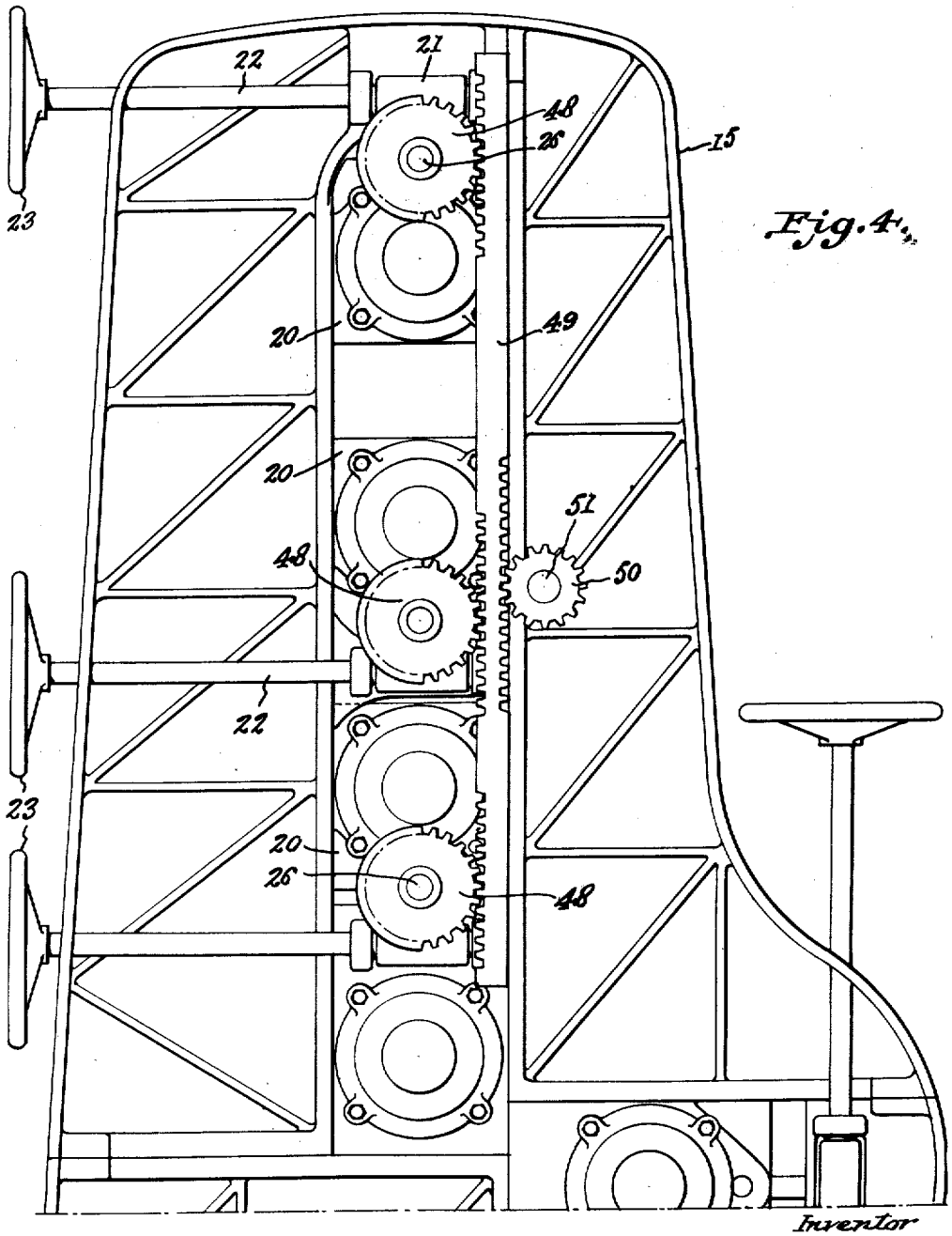
Figure 4 is a similar view showing another modified form of the roll operating mechanism for simultaneously opening the rolls.

In Figure 4 another modification is shown and wherein the eccentric shafts 26 of Figures 5 and 6 are provided with pinions 48 on their outer ends in place of the crank levers 30, and wherein a rack bar 49 is slidably mounted at the side of the frame 15 and has toothed portions disposed opposite the pinions 48 and which mesh with these pinions at all times so as to simultaneously and equally turn the pinions upon the shifting of the rack bar 49. The rack bar 49 may be shifted in any suitable manner, such as by means of an operating pinion 50 mounted on the shaft 51 in the frame 15, and the latter may have a crank handle or the like thereof for turning the shaft 51 the required distance for turning all of the eccentric shafts 26 simultaneously and equally to open and close the rolls of the mill.

It will be particularly noted that in all of these forms of the invention the rolls are disposed in line, that is the rolls which are movable; and consequently by the novel means of this invention these rolls may be quickly operated by one mechanism so as to open and close the rolls without disturbing in any manner the fine and delicate adjustment which is obtained by the individual gearing of the rolls.

It will also be noted that in each form the movement for each roll is different from that for the other rolls in order to move the rolls through unequal distances, to the end that they will be spaced apart substantially by equal distances when opened. It is also apparent that a single operating member coordinates the movement of all the rolls to cause them to move freely apart as soon the movement commences. The eccentric arrangement keeps the roll movement under accurate control at all times. The drawings show exemplary forms of eccentric means. In Figure 5 the eccentrics or cams 65 are shown to have unequal throws, and the same is true of the eccentrics or cams 41 shown in Figure 3. All of the eccentrics are moved by a single common control member in each case.

In operation, when it is desired to open the rolls quickly it is only necessary to operate a single device, such as the crank handle 35 in Figure 1, the shaft 47 in Figure 3 and the shaft 50 in Figure 4. In each instance the respective crank shafts 26 of Fig. 4 and 42 of Fig. 3 are turned to rotate the eccentrics 65 and 41 for moving the respective bearings of the rolls into open and closed positions.

Figure 2:
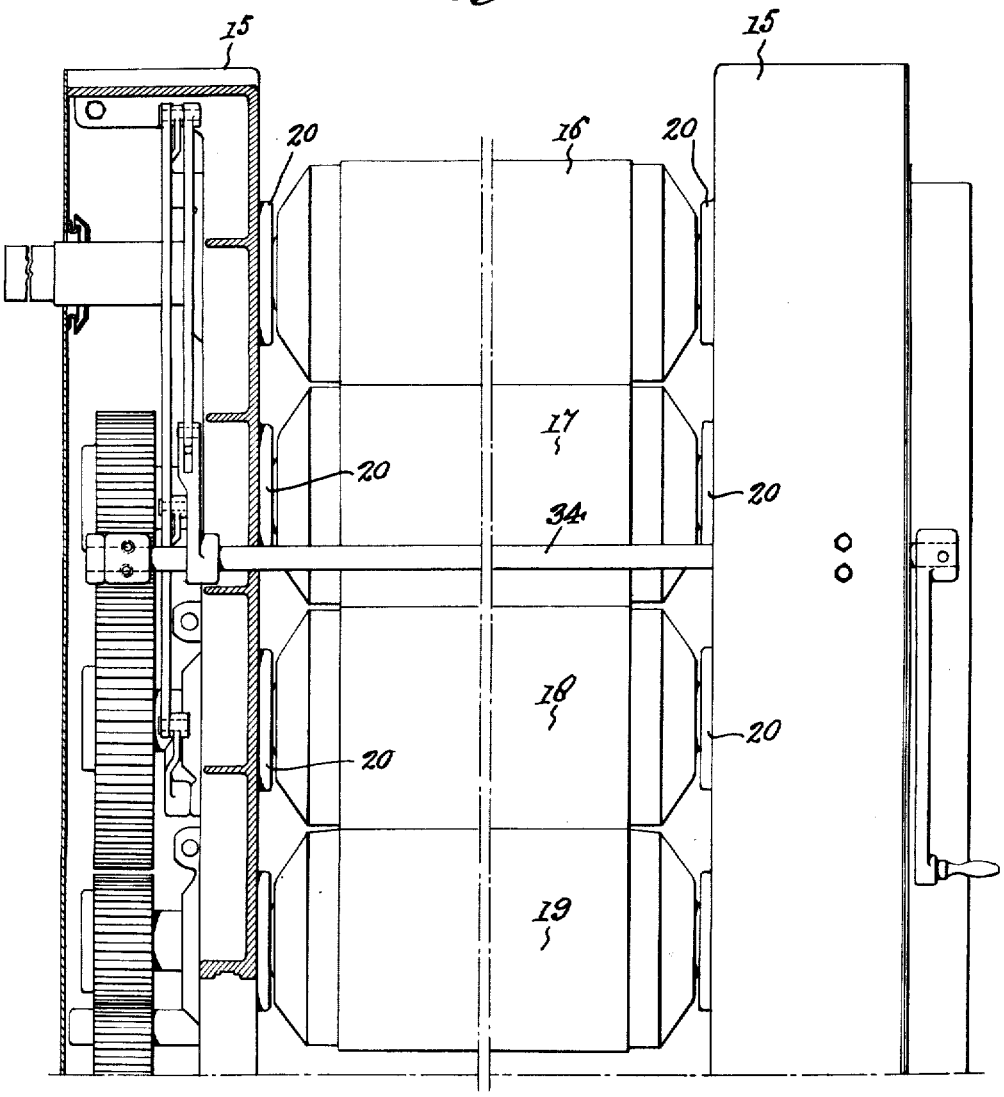
Figure 2 is a front elevation of the roller mill with the frame broken away at one end to show the single roll operating mechanism.

As shown in Figure 2, the operating shaft 34 extends from one end of the mill to the other so that the operating handle 35 which turns the shaft 34 may operate the quick connections at the opposite ends of the rolls. The rolls are thus bodily separated when the single operating device or mechanism is actuated for that purpose.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a roller mill, a frame, a plurality of rolls mounted in the frame and having bearing blocks slidable therein, individual adjusting means for the rolls disposed between the frame and the respective bearing blocks for obtaining delicate adjustments between the rolls, eccentric connections disposed between the bearing blocks and said individual adjusting means and each having an operating lever, a connecting link connecting all of said levers, and a dead center operating device connected to said connecting link for normally holding the same locked in the normal position and adapted for movement to release the connecting link and shift the same to simultaneously operate the eccentrics and open the rolls.

2. In a roller mill, a frame, a plurality of rolls mounted in line in the frame and having bearing blocks slidable in the frame such that the axes of said rolls are slidable in a single plane, fine adjustment connections between the bearing blocks and the frame for individually adjusting the rolls, eccentric connections between the fine adjustment connections and the bearing blocks for quickly opening and closing the rolls, and a common operating means extending along the line of said rolls and connected to the eccentrics of said connections for simultaneously operating the same to open and close the rolls.

3. In a roller mill, a frame, a plurality of rolls in the frame, bearing blocks for each of said rolls slidable in a single plane in the frame and maintaining the axes of said rollers in a single plane, lugs mounted for fine adjustment of the blocks in the frame, lugs on the bearing blocks for overlapping engagement with the lugs on the frame, eccentric shafts connecting the lugs of the frame and bearing blocks together and having eccentrics engaging in the lugs for turning therein by the eccentric shafts to draw said lugs into overlapping relation and shift the bearing blocks in the frame and common operating means for all of the eccentric shafts to simultaneously turn the same in one direction for opening the rolls and in the opposite direction for closing the rolls without disturbing the mounting of said lugs on the frame.

4. In a roller mill, a frame, a plurality of rolls mounted in the frame with their axes in line, individual fine adjustment means between the frame and the rolls, coarse adjustment means between said first means and the rolls for opening and closing the same without disturbing the fine adjustment means, said coarse adjustment means including individual eccentric shafts for the rolls, a pinion mounted on each shaft with the pinions disposed in line at the end of the frame, a rack bar engaging across said pinions, and a single operating member connected to the rack bar for shifting the same in one direction to quickly open the rolls and in an opposite direction to quickly close the rolls.

5. A roller mill comprising a frame, a stationary roll mounted in said frame, a plurality of adjustable rolls in said frame, bearing blocks for each of said adjustable rolls, said blocks being slidably mounted in the frame for adjustment of said rolls, individual fine adjustment means between the frame and the bearing blocks for obtaining delicate adjustment of said rolls, quick acting eccentric connections between the rolls on the bearing blocks for adjustment of the rolls relative to the bearing blocks independently of the fine adjustment of the bearing blocks, a lever for operating each of said quick acting eccentrics, a rigid link pivotally connecting all of said levers, a single operating lever for moving said rigid link and toggle means connecting said lever with said link to provide a dead center lock when the rolls are in operating position.

6. In a roller mill, a frame, a stationary roll mounted in said frame, a plurality of adjustable rolls mounted in line in the frame on one side of said stationary roll and journaled in bearing blocks slidably mounted in said frame, the axes of said adjustable rolls lying in a single plane and said rolls being adjustable in said plane, individual fine adjustment means between the frame and the bearing blocks for obtaining delicate adjustment of said rolls, individual eccentric means operatively connected to said bearing blocks for quickly moving said adjustable rolls in a straight line and through unequal distances towards and away from said stationary roll, and a common operating means extending along the line of said rolls and connecting said eccentric means for producing simultaneous operation of said eccentric means constructed and arranged in such manner that said rolls can be moved simultaneously and separated from each other as well as from said stationary roll without disturbing the setting of said fine adjustment means.

7. The roller mill of claim 2 wherein one of said rolls is stationary and wherein the adjustable rolls are mounted on one side of the stationary roll.

8. In a roller mill, a frame, a stationary roll mounted in said frame, a plurality of adjustable rolls mounted in line in the frame on one side of said stationary roll and journaled in bearing blocks adjustably mounted in said frame, the axes of said adjustable rolls lying in a single plane and said rolls being adjustable substantially in said plane, individual fine adjustment means between the frame and the bearing blocks for obtaining delicate adjustment of said rolls, individual eccentric means operatively connected to said bearing blocks for quickly moving said adjustable rolls in substantially a straight line and through unequal distances toward and away from said stationary roll, and a common operating means extending along the line of said rolls and connecting said eccentric means for producing simultaneous operation of said eccentric means constructed and arranged in such manner that said rolls can be moved simultaneously and separated from each other as well as from said stationary roll without disturbing the setting of said fine adjustment means.

9. A roller mill comprising in combination, a frame, a train of mutually co-acting rolls mounted in said frame, said train including a fixed roll and a plurality of adjustable rolls provided with bearings adjustably mounted in line on one side of said fixed roll, means for imparting a fine working adjustment to the bearings of said adjustable rolls, and quick-acting means providing coordinated movement of the bearings of all of said adjustable rolls through progressively increasing distances away from or toward said fixed roll to completely separate and reset the rolls without changing the working relationship of said rolls as determined by the setting of the fine adjusting means, said quick-acting means including means disposed in a locking position when the rolls are reset in a closed relationship to provide a rigid non-shiftable resistance to the roll bearings.

10. A roller mill comprising in combination, a frame, a train of mutually co-acting rolls mounted in said frame, said train including a fixed roll and a plurality of adjustable rolls provided with bearings adjustably mounted in line on one side of said fixed roll, means for imparting a fine working adjustment to the bearings of each of said adjustable rolls, and quick-acting means providing co-ordinated movement of the bearings of all of said adjustable rolls through progressively increasing distances away from or toward said fixed roll to completely separate and reset the rolls without changing the working relationship of said rolls as determined by the setting of the fine adjusting means, said quick-acting means including eccentric means and unitary operating means therefor providing different amounts of movement for the bearings of the different rolls of the same movement of said unitary operating means, said eccentric means being placed in a dead center locking position when the rolls are closed to working position.

RICHARD GOLL.

CERTIFICATE OF CORRECTION.

Reissue No. 20,918. November 15, 1938.

RICHARD GOLL.

It is hereby certified that error appears in the printed specification of the above numbered patent requiring correction as follows: Page 2, second column, line 72, after the word "soon" insert as; page 4, second column, line 21, claim 10, for "of" after "rolls" read for; and that the said Letters Patent should be read with this correction therein that the same may conform to the record of the case in the Patent Office.

Signed and sealed this 31st day of January, A. D. 1939.

Henry Van Arsdale (Seal) Acting Commissioner of Patents.